(12) United States Patent
Kremin et al.

(10) Patent No.: US 9,229,577 B2
(45) Date of Patent: Jan. 5, 2016

(54) METHOD AND APPARATUS FOR REDUCING COUPLED NOISE INFLUENCE IN TOUCH SCREEN CONTROLLERS

(71) Applicant: Parade Technologies, Ltd., Santa Clara, CA (US)

(72) Inventors: Viktor Kremin, Lviv (UA); Anton Konovalov, Khmelnitsky (UA)

(73) Assignee: PARADE TECHNOLOGIES, LTD., Santa Clara, CA (US)

( * ) Notice: Subject to any disclaimer, the term of this patent is extended or adjusted under 35 U.S.C. 154(b) by 0 days.

(21) Appl. No.: 14/612,255

(22) Filed: Feb. 2, 2015

(65) Prior Publication Data

US 2015/0205438 A1    Jul. 23, 2015

Related U.S. Application Data

(63) Continuation of application No. 12/907,989, filed on Oct. 20, 2010, now Pat. No. 8,947,373.

(60) Provisional application No. 61/323,907, filed on Apr. 14, 2010, provisional application No. 61/253,142, filed on Oct. 20, 2009.

(51) Int. Cl.
   G06F 3/041    (2006.01)
   G06F 3/044    (2006.01)
   G02F 1/1333   (2006.01)

(52) U.S. Cl.
   CPC .......... *G06F 3/0418* (2013.01); *G02F 1/13338* (2013.01); *G06F 3/044* (2013.01)

(58) Field of Classification Search
   CPC .... G02F 1/13338; G06F 3/0418; G06F 3/044
   USPC ........................................................ 345/173
   See application file for complete search history.

(56) References Cited

U.S. PATENT DOCUMENTS

| | | | | |
|---|---|---|---|---|
| 2002/0089491 A1* | 7/2002 | Willig | ............... | G06F 3/0412 345/173 |
| 2006/0146038 A1* | 7/2006 | Park | ................. | G06F 3/0412 345/173 |
| 2007/0071153 A1* | 3/2007 | Eglit | ................. | H04L 7/0054 375/355 |
| 2007/0120831 A1* | 5/2007 | Mahowald | ........... | G06F 3/03548 345/173 |
| 2007/0262966 A1* | 11/2007 | Nishimura | ............. | G06F 3/044 345/173 |
| 2008/0062148 A1* | 3/2008 | Hotelling | ............. | G02F 1/13338 345/174 |
| 2008/0309627 A1* | 12/2008 | Hotelling | ............. | G02F 1/134363 345/173 |
| 2008/0309633 A1* | 12/2008 | Hotelling | ............. | G06F 3/0412 345/173 |
| 2009/0115737 A1* | 5/2009 | Toyoshima | ............. | G06F 3/044 345/173 |
| 2009/0228224 A1* | 9/2009 | Spanier | ................. | G01R 22/10 702/60 |

\* cited by examiner

*Primary Examiner* — Viet Pham
(74) *Attorney, Agent, or Firm* — Morgan, Lewis & Bockius LLP

(57) ABSTRACT

Apparatuses and methods to reduce the influence of a noise signal on touch screen controllers are described. One apparatus includes a detector to determine a presence of a noise signal from a display coupled to a capacitive touch screen. The apparatus also includes a synchronization circuit to synchronize signals produced by a touch screen controller with the noise signal to reduce the influence of the noise signal on capacitance measurements by the touch screen controller.

20 Claims, 11 Drawing Sheets

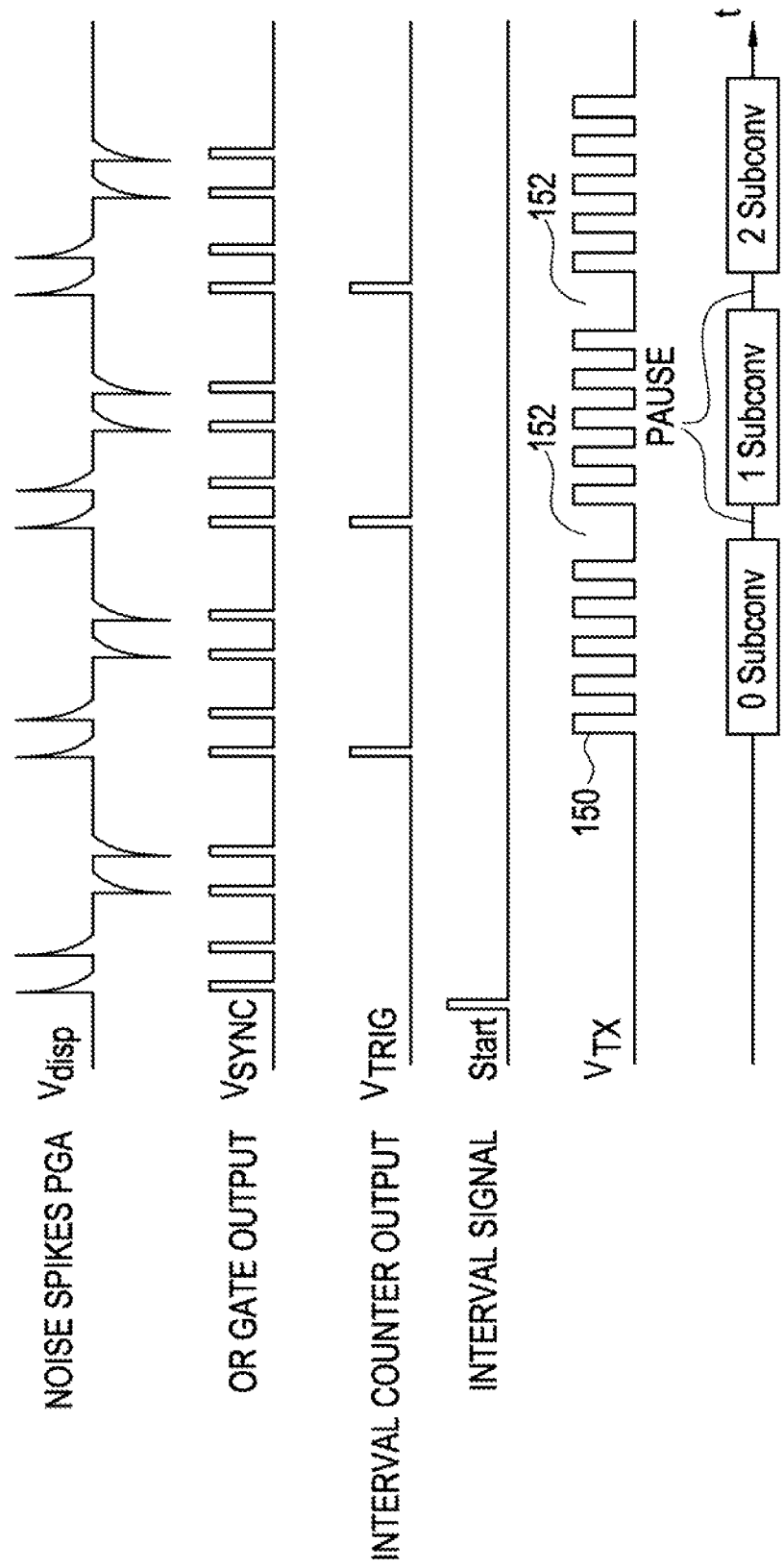

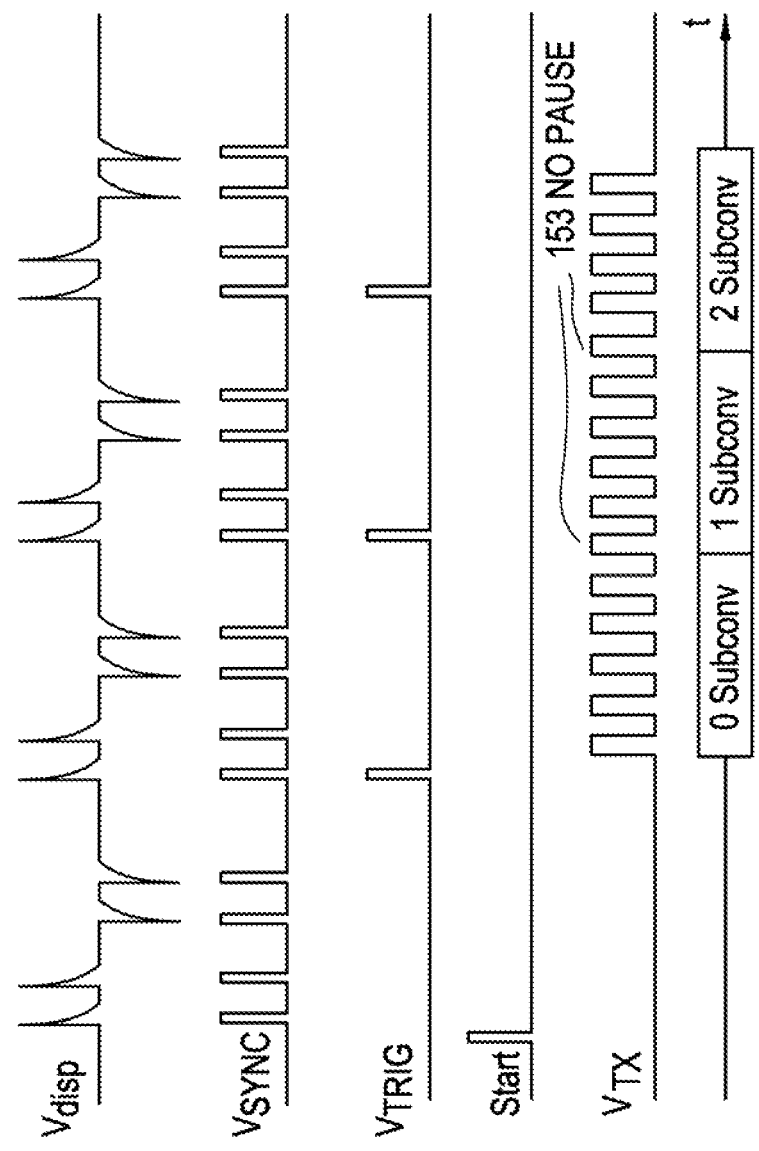

METHOD AND APPARATUS FOR REDUCING COUPLED NOISE INFLUENCE IN TOUCH SCREEN CONTROLLERS

RELATED APPLICATIONS

This application is a continuation of U.S. patent application Ser. No. 12/907,989, filed Oct. 20, 2010, which claims priority to U.S. Provisional Application No. 61/323,907, filed Apr. 14, 2010, and U.S. Provisional Application No. 61/253,142, filed Oct. 20, 2009, all of which are incorporated by reference herein in their entirety.

TECHNICAL FIELD

The present invention relates generally to devices employing a display coupled with a touch screen interface and, more particularly to methods and apparatus for limiting the influence of display generated noise.

BACKGROUND

Touch screens are user interface devices employed with electronic visual displays that may detect the presence of a touch on or in the vicinity of a display area of a touch screen or panel. A known touch screen user interface employs transparent conductive electrodes composed indium tin oxide or ITO which overlay the display such as an LCD or other suitable display device.

The term touch screen generally refers to a transparent panel overlaying an display, such as an LCD, which may be touched with a finger, hand or stylus to produce an output signal or indication, and may also include so-called proximity or gesture detectors which can affect the output as well. When implemented to detect and identify a plurality of touches, such touch screen devices generally employ so called transmit electrodes Tx or Tx ouputs and receive electrodes Rx or Rx outputs. These electrodes are transparent and are laid out in an approximately orthogonal grid arrangement such that the Rx and Tx electrodes cross over each other resulting in inter-electrode or mutual capacitance. When a user touches the panel, the inter-electrode capacitance between the Rx and Tx electrodes changes. The Rx and Tx electrodes are periodically scanned by means of a touch screen controller having a processing unit (e.g., CPU) responsively coupled thereto. The changes in capacitance thus form sensible signals which may be interpreted by software in the CPU which performs selected functions.

The display located behind the transparent touch screen allows the user to view the images displayed by the display. The user thus has a convenient interface whereby they may touch the touch screen panel and the images viewed through the panel may be manipulated or interacted with, and changes may be viewed as successive images on the display. This results in a versatile interface which is currently in use in a wide variety of devices including touch screen computers, smart phones and personal digital assistants (PDAs). Unfortunately, the normal operation of the LCD often produces electrical noise which adversely affects or influences the capacitances measured by the touch screen controller. The noise produced by the display may be dependent on for example the displayed image, mechanical construction of the display, drive/refresh method of the display, materials used in the display and signaling dependent. This noise can interfere with or unduly influence the capacitances measured by the touch screen controller thereby resulting in errors in reported touches or locations of touches.

Various noise suppression approaches have been attempted, including synchronization using phase locked loop PLL systems. These tend to be expensive and difficult to implement, because they require complex circuitry and high processor overhead and speeds. Another solution has been to increase the Tx signal strength in the touch screen controller, but this decreases battery life. Other exemplary software and hardware approaches currently available have had mixed results, and each exhibit disadvantages in terms of cost, implementation and performance.

Another approach has been to physically shield the display noise from the touch screen by locating a transparent shielding electrode between the and the touch screen, or increasing the spacing between the display and the touch screen, or both. These approaches are direct and can be effective, but they often increase cost. More importantly these methods result in a thicker, more bulky touch screen device which may be commercially unattractive, because users seem to prefer slim, light weight devices.

Other techniques employ specialized firmware, which adds cost and reduces the competitiveness of the resulting system.

SUMMARY OF THE INVENTION

There has been provided a method and apparatus for reducing the influence of noise produced in a display (e.g. an LCD) on touch screens and their associated controllers which employ a noise detector for producing an output in response to an edge of recognized noise; and a state machine responsive to the output for synchronizing the generation and measurement of the signals used to measure the capacitances of the touch screen and produce an output.

The apparatus may further include a noise filter, sometimes for brevity referred to simply as a filter, responsive to the noise coupled to the touch screen for averaging the noise over a measurement interval. This filter may employ a plurality of registers or other storage elements responsive to the measured values of capacitance and noise for storing the measured values, and wherein the noise filter may include a median filter for discarding the highest and lowest values and averaging remaining measured values.

The noise detector may comprise one or more noise comparators responsively coupled to selected Rx and Tx electrodes of the touch screen for producing an output indicative of the presence of a noise event. In an exemplary embodiment, a gain balancing network is provided for balancing the gain at each selected Rx and Tx electrode. The devices may employ analog or digital circuit implementations.

In another exemplary embodiment, a delay line may be responsive to the capacitance signal for producing a delay interval wherein a selection may occur. A noise sensor or detector detects the noise and directs a selector to present either the sampled capacitance signal when noise is below a reference noise level or to present a reference (e.g., ground) level when noise is above a reference noise level to a sample and hold circuit. A sample and hold circuit may be responsive to the delayed capacitance signal, and an integrator integrates the sampled signal over the selected interval. In one embodiment the interval may be fixed and in another embodiment the interval may be variable.

In another embodiment, the touch screen capacitance is measured in bursts, and a timer is responsive to the noise detector output for measuring a duration between a selected number of noise pulses in first and second modes. In a first mode capacitance is measured in bursts separated by a pause interval, and in a second mode the capacitance is measured continuously using immediately consecutive bursts.

In yet another embodiment, the noise detector gates the measured capacitance signal for a selected blanking interval after synchronization when noise may be present and the detector measures the capacitance signal after the blanking interval when noise may be absent.

In an exemplary embodiment there is provided an apparatus for reducing noise influence on capacitance data measured by a touch screen controller comprising a bus including a bus connection switch adapted to be responsively coupled to one or more Tx and Rx lines in a touch panel coupled to an LCD display; a programmable gain amplifier coupled to the bus connection switch; a threshold comparator coupled to the programmable gain amplifier or PGA responsive to positive and negative going noise pulses for producing a corresponding output indicative thereof; a synchronization noise multiplexor responsively coupled to an output of the threshold comparator and a logic synchronization signal for producing a synchronization event signal; a programmable look up table or LUT for storing a plurality of programmed conditions, said LUT having first and second inputs being respectively responsive to the synchronization signal and programmable delay line for producing an output in accordance with the programmed conditions; a programmable delay line responsively coupled to the synchronization signal for presenting a delayed form of the synchronization signal; an interval counter responsive to the synchronization event signal for counting synchronization intervals; an interval discriminator responsive to the interval counter for discriminating an interval between the edges of successive synchronization event signals; and an intervals FIFO buffer or FIFO coupled to the interval counter for storing intervals between successive synchronization event signal edges.

There is also provided a method, implemented by a capacitance measuring and computing system programmed to perform noise listening from an LCD display for detecting noise having specific signal characteristics; and performing synchronization on the detected noise to increase the signal to noise ratio or SNR of the measured capacitances.

The method further includes at least one of sensing inputs from selected Tx and Rx electrodes of the touch screen panel; filtering the noise from the measured capacitances employing at least one of a window filter, an averaging filter and a median filter; discarding a highest and lowest capacitance value and averaging values there between; delaying the capacitance signal for a selected fixed or variable interval after synchronization; blanking the signal for a selected interval after synchronization when noise may be present; and measuring the signal subsequent to the selected interval when noise may be absent.

BRIEF DESCRIPTION OF THE DRAWINGS

The present disclosure is illustrated by way of example, and not by way of limitation, in the figures of the accompanying drawings.

FIG. 4A illustrates a timing chart for the arrangement of FIG. 2 in a first synchronization mode.

FIG. 4B illustrates a timing chart for the arrangement of FIG. 2 in a second synchronization mode.

DETAILED DESCRIPTION

A method and apparatus for reducing the influence of display (e.g., an LCD) noise in capacitive sensed touch screens may be provided. In one embodiment a synchronization technique is employed to implement noise reduction. In another embodiment synchronization may be combined with a noise blanking feature. In yet another embodiment, a variety of sensing arrangements are featured. Another embodiment employs a delay line for restoring lost or noise damaged signal. In still another embodiment, filtering techniques are described. These techniques may be used alone or in selected combinations which enhance performance.

Figure 1:
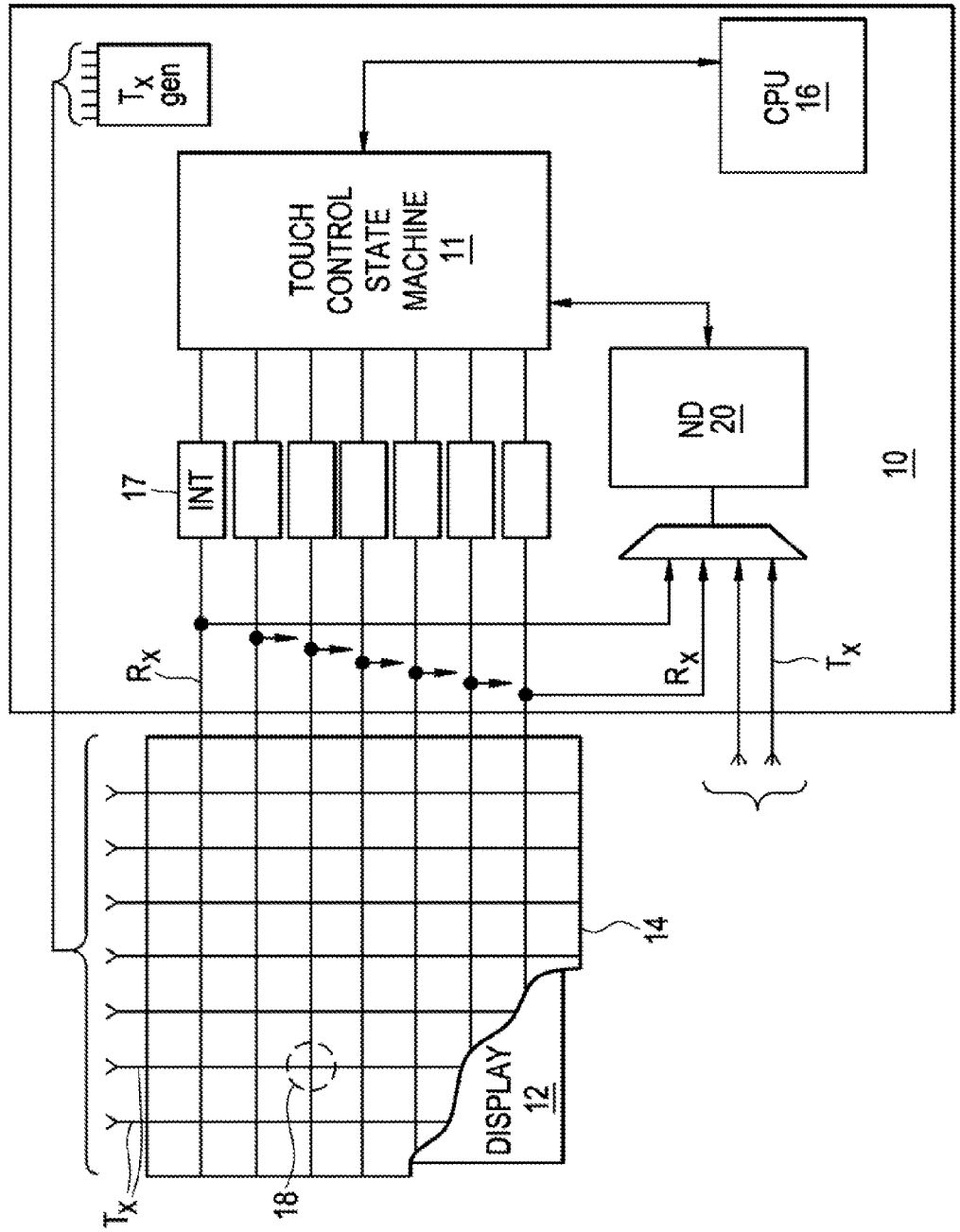
FIG. 1 illustrates a schematic block diagram of a generalized display noise suppression system for a touch screen controller.

FIG. 1 illustrates a generalized illustration of a touch screen coupled with a touch screen controller 10 incorporating a noise reduction system. The touch screen controller 10 is coupled to a transparent touch screen or panel 14. A display 12 is positioned behind the touch screen panel 14, such that the display 12 produces an image which may be viewed through the screen 14. The display 12 described in various embodiments herein may be any display device such as but not limited to LCD (Liquid Crystal Display), AMOLED (Active Matrix Organic Light Emitting Diode), electrostatic deflection MEMS (Micro-Electro-Mechanical Systems), plasma displays, electrophoretic displays and the like. In an exemplary embodiment, the touch screen controller 10 may be electrically coupled to an indium tin oxide (ITO) touch screen panel 14 coupled with the display 12, and is known and regularly referred to in the art as an ITO touch screen controller. A central processing unit or CPU 16 manages the operation of the touch screen controller 10. The CPU 16 may be normally implemented as part of the touch screen controller, but its functions of digital filtering, baselining, centroiding, finger tracking, gesture recognition, etc. may be performed at other parts in the end product or distributed such that some are performed in the touch screen controller and others are performed by one or more other CPUs.

The touch screen or panel 14 has an array of touch sensitive electrodes comprising receive (Rx) electrodes and transmit (Tx) electrodes arranged approximately orthogonally in a spaced relationship which cross at intersections 18 in a known manner. The Tx and Rx electrodes may be separated by an insulating layer (not shown) which results in an inter-electrode (mutual) capacitance at each of the intersections 18 where the each Tx electrode crosses an Rx electrode. An active Tx electrode may be coupled to a Tx generator 13 which produces a scanning signal capacitively coupled via the proximate intersection 18 to the Rx electrodes. When a conductive object such as a human finger or bulk conductive stylus is positioned at or near an intersection 18, the inter-electrode capacitance may change resulting in a corresponding change in the signal coupled to the Rx electrodes and to the capacitance measurement circuits within touch screen controller 10. Once measured by the touch screen controller, the result may be evaluated by the CPU 16 in order to locate where, on the touch screen 14, one or more touches (if present) occurred, and performs a function depending on the one or more locations where or how the touch screen was touched. A noise suppression system 20 responsively coupled to the Tx and Rx electrodes is adapted to suppress or reduce the influence of noise produced by the display, and coupled to the touch screen and touch screen controller 10.

In various techniques described herein, certain assumptions are made concerning the noise signals produced by the display or other display and the characterization of the resulting noise. In general it is assumed that the noise may be periodic and typically image dependent. Sonic noise may be randomly generated and particular implementations are employed to eliminate these sources. However, periodic noise typically has a greater influence on the capacitance signal measured by touch screen controllers, and the methods and apparatus described herein are generally directed at such influential noise.

Capacitive sensing touch screens, capable of detecting the presence of multiple conductive objects, typically do so by measuring the small changes in the mutual capacitance between each Tx and Rx electrode introduced by the presence of a conductive object near the intersections 18. To measure such changes in mutual capacitance, an AC voltage signal may be driven (transmitted) into one or more Tx electrodes of the touch panel 14. That AC voltage signal causes charge to couple through the mutual capacitors present where the Tx and Rx electrodes cross at the intersections 18. The touch screen controller 10 employs charge integrators 17, feeding inputs to touch control state machine 11, and being responsively coupled to the Rx electrodes as shown. Charge coupled to each Rx electrode may thus be integrated by the charge integrators 17 and measured by the touch control state machine 11.

Typically the intersections of the touch panel 14 are scanned and refreshed periodically in accordance with a refresh period or scanning signal. Such touch screens may be laminated to or otherwise coupled to the display 12 (e.g., LCDs or similar displays) to allow the display to be viewed through the touch screen, and to allow the user to interact with the images presented on the display. The display 12 may also be scanned and refreshed periodically to update and maintain the displayed image. The periodic electrical signals used for this update produce electrical noise which may couple to the touch screen 14. The timing of the display signals may be useful in sensing, interpreting and suppressing noise, but these may normally be asynchronous to the clocks, scanning, signals, and other operations of the touch screen controller. The time to measure the capacitance at an intersection of the touch screen, known as a conversion, tends to be several times larger than the operation frequency (Tx excitation frequency) of the touch panel, and of many of the noise pulses from the display 12. Thus, depending on the specific type of display, its noise may affect only one or two Tx operational periods during a conversion, or may corrupt all Tx cycles. Multiple short measurement periods are known as subconversions. Noise pulses typically occur more frequently during the conversion period. This means that the fewer the number of Tx pulses present in each subconversion, the lower the probability that each subconversion result has been corrupted by an display 12 noise event; e.g., an LCD noise event may affect only some of the subconversions, but not all of them. Thus, in accordance with an embodiment, one way to reduce noise may be to filter affected subconversions for removal a of coupled display's noise spikes.

A method for reducing coupled display noise influence in an ITO touch screen controller according to an embodiment employs a noise synchronization technique. According to the method, the start of a conversion or subconversion may be synchronized with an edge of a noise pulse from the display.

In one embodiment, a state machine may be employed to control the synchronization sequence in different modes, wherein the specific mode used may be dependent on the specific periodic timing of the coupled noise from the display. In one mode, referred to as individual subconversion synchronization, the state machine may wait for a synchronization noise event to start each subconversion. In a second mode, referred to as whole sample conversion synchronization, the state machine may wait for the synchronization event for the first subconversion only, and subsequent subconversions may be executed automatically in series.

As noted above, display noise may be pulsed noise, caused by the LCD excitation drive pulses to the row, column, VCOM, and pixel storage electrodes of the device. Intervals between noise pulses range from about 2-3 µs to about 200 µs for DC VCOM line inversion and dot inversion displays, but may extend to greater than 10 ms for AC VCOM field inversion displays. Some pulses may be simple periodic waveforms. Others may be more complex with multiple edges, yet periodic in nature.

Several different techniques are proposed for noise influence minimization. An effective technique involves filtering individual Tx periods by using a switching capacitor delay line, discussed hereinafter in connection with FIGS. 7 and 8, and a hardware filter with an adaptive noise threshold. Another technique filters individual subconversions with non-linear firmware employing a filter such as a median, window or other types of non-linear filters. Yet another technique selectively couples Rx and Tx electrodes to the touch control state machine 11.

A noise listening technique may be employed in an exemplary embodiment, because it eliminates the requirement for a control signal connection between the display 12 and the touch controller. As implemented, the noise synchronization system may also make use of an external sync signal from the display's controller (not shown), which may be provided to the synchronization state machine when selected by a multiplexor through assertion of the Sync Source signal discussed in greater detail hereinafter. When used alone, noise listening may be typically less effective than external synchronization due to phase jitter and higher sensitivity to various noise sources.

The term conversion as used herein means a time interval during which the capacitance of a touch screen element may be measured and converted to one or more numerical values. The result of a conversion may be a numerical value, which may be used for subsequent processing, e.g., calculation of touch coordinates. As used herein, one conversion comprises an integer multiple of analog integration intervals referred to as subconversions, and each subconversion spans an integer number of Tx excitation cycles. Each subconversion may be an atomic event; i.e., once started it must run to completion. The result of each subconversion may be a digital value. Multiple subconversions may be integrated digitally to form a full conversion result.

In the absence of significant display noise, normally a touch system operates only with conversion results. The CPU 16 receives as input the conversion results from measuring the capacitances of all intersections of the touch screen panel 14. Individual subconversions may be processed further for additional pulsed noise suppression. This can be achieved using non-linear filters, e.g., median filters, window filters and the like, which are discussed hereinafter.

There are several kinds of noise signals such as noise from the display and noise from battery chargers and other sources. An exemplary embodiment handles noise signals originating in the display. These display noise signals may have particular characteristics, namely the noise may be pulsed based, e.g., narrow spikes may be separated by pauses, wide square waves; noise waveforms may be complex, but are often periodic; and some noise sources are image dependent waveforms or noise patterns.

Displays also may have noise waveforms or patterns which are referred to herein as model or manufacturer dependent. Some displays provide noise with intervals between pulses close to the Tx excitation frequency, where the minimum interval between noise edges may be about 5 μs with a panel scanning frequency of 250 kHz, resulting in an operation period of about 4 μs. Noise from other displays may have a much larger period, e.g., 10-20 μs.

Capacitive noise coupling of the type described occurring between the display and the ITO touch screen may have certain characteristics. For Example, coupling capacitance may be about 5-20 pF. Coupling may be dependent in part on the panel size and the air gap (if present) between the panel and display (e.g., display 12).

Capacitively coupled noise voltage signals are normally translated into current pulses so that they may be injected into a capacitance measurement channel. This can result in excessive digital variation which may overwhelm conversion results.

In an exemplary embodiment, noise suppression may be achieved electrically by a technique referred to as synchronization. In an arrangement where the noise frequency may be much lower than the panel scanning frequency, scanning may be performed during quiet intervals. Using this option, it may be possible to almost completely eliminate display noise influence.

Where the noise frequency approximates the panel scanning frequency, scanning may be done by matching the phase relationship between the display noise and the Tx pulses used for scanning. In this case, there may be some noise charge injected into the receiver channel during each conversion. However, resulting variation in measured result due to noise may be reduced as the noise injection is synchronized with scanning, such that the same amount of noise charge is always included in each measurement. Under these conditions the noise becomes an offset in the measurement that may be approximately constant from one subconversion or conversion to the next.

There are a number of exemplary techniques available to acquire the synchronization signal. One option may be to route an external digital synchronization signal from the display to the touch screen controller. Use of this option may be limited, because most display manufacturers do not provide a synchronization signal directly. If supported by the manufacturer, the signal originates in the display driver or display controller (not shown) depending on the particular implementation under consideration. When this signal is available, it may be possible to skip the noise listening step which is described below. Because the noise must still be aligned to the scanning or measurement process, it may often still be necessary to add a fixed delay between the presence of the synchronization signal and the start of measurement.

When a synchronization signal is not available from the display controller, a synchronization signal may be developed by listening to the noise signal from the display, i.e., sensing the noise coupled from the display to the touch screen panel electrodes. This may be achieved by connecting selected Tx or Rx electrodes to a noise detection circuit. During subconversions, any of the various panel electrodes Tx and Rx could be employed. When scanning of the touch screen is in progress, one or more unused Tx electrodes are typically employed. Active scanning sometimes results in Tx crosstalk which may require additional filtering.

In order to provide for the availability of an external digital synchronization signal provided by the display manufacturer, a sync mux, discussed below, may be employed. If the sync signal is provided by the manufacturer, it may be connected directly to the state machine. If it is not provided, the listening feature may be employed to develop the sync signal. In the exemplary embodiment the sync mux employed comprises a firmware configurable mux which may be used to select between the aforementioned synchronization sources which may be available.

Another exemplary embodiment for display noise reduction involves subtracting the noise signal from the measured signal. This may be performed digitally using a noise listening channel to form a pseudo-differential sensing channel. This may also be implemented in analog form by subtracting the noise as a common mode element from the measured signal using a differential amplifier. Unlike the analog implementation described herein, the use of a separate listening channel allows the difference to be processed digitally. The output of the noise listening channel may be subtracted from the remaining Rx channel readings. The function may be accomplished by a CPU, or alternately by processed by ALU within the touch control state machine 11. This may be combined with a gain control network coupled to each Rx and Tx electrode selected for listening in order to achieve gain balancing for improving noise suppression. Alternately, the gain or scaling may be performed by the CPU or ALU.

Figure 2:
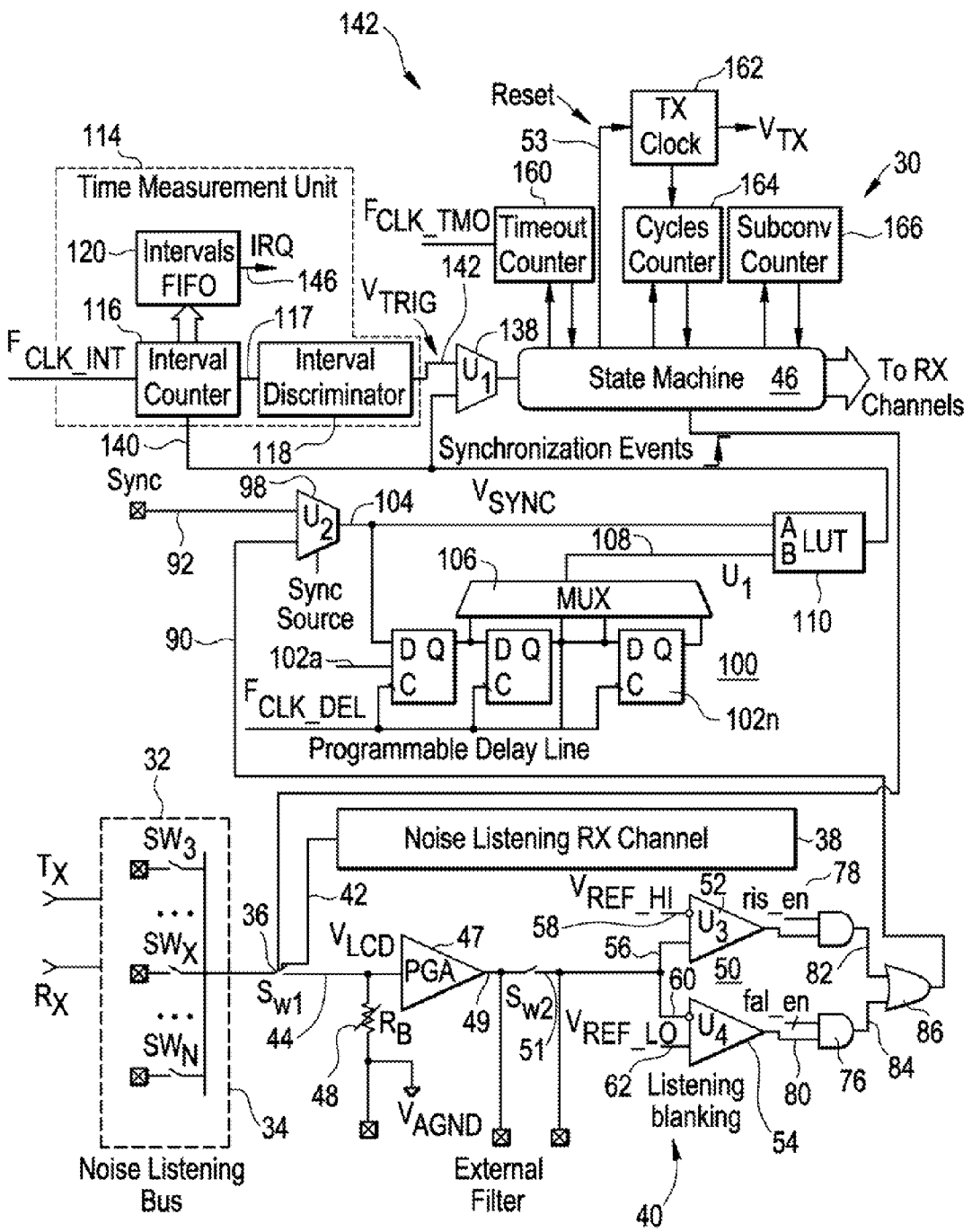
FIG. 2 illustrates a schematic block diagram of a display noise suppression system employing synchronization and noise listening.

FIG. 2 illustrates an exemplary technique for synchronizing subconversions starting with the detected edge of the noise event. Such a technique may result in relatively effective noise reduction or minimization and improve the signal to noise ratio (SNR) significantly, i.e., several times. Noise synchronization may be combined with other techniques, e.g., filtering, delay line reconstruction, and the selective sensing technique, to further improve SNR.

Referring to FIG. 2, an exemplary noise suppression circuit 30 may be located in touch control state machine 11 (FIG. 1). The suppression circuit may employ a noise listening bus multiplexor 32 responsively coupled to selected Tx and Rx electrodes from ITO touch screen 14. The noise listening bus multiplexor 32 may be employed to couple one or more of electrodes Tx and Rx to a noise listening bus 34. The bus 34 may receive display sourced noise signals from the noise listening bus multiplexor 32 as shown. While embodiments of the noise suppression circuit described herein are specifically applied to noise events generated by displays, other embodiments of the noise reducing circuit could be used to reduce noise generated by other noise producing events that couple to the touch screen and touch screen controller, such as ESD events, battery charger and DC-DC converter noise events and the like.

A control switch 36 (Sw1), having outputs 42 and 44 to receive and direct the noise to selective locations, may be connected to the noise listening bus 34. In the exemplary embodiment, a noise listening Rx channel 38 and a noise detection circuit 40 are coupled to respective outputs 42 and 44 of the control switch 36. A state machine 46 controls or supports three modes of operation of the control switch $S_{w1}$ 36 as follows: a) automatic switching between noise listening Rx channel 38 over output 42, and noise detection circuit 40 over output 44; b) permanent or fixed connection only to the noise detection circuit 40 via output 44; and c) permanent or fixed connection only to the noise listening Rx channel 38 via output 42. In an alternate embodiment the control switch 36 may be under the control of a CPU running a program.

The noise detection circuit 40 includes a programmable gain amplifier or PGA 47 coupled to the corresponding switch output 44. A programmable bias resistor (Rb) 48, coupled to the input of the programmable gain amplifier 46, sets an equivalent differentiating RC network time constant. The differentiating network (not shown) may include the capacitance and resistance of the various electrodes in the panel 14, and the resistance of the noise listening bus multiplexor 32 and various parasitic capacitances which may exist in electronic circuits. Adjustment of the bias resistor Rb may be used to set the time constant of the particular system.

A control switch $S_{w2}$ 51 couples the PGA 47 to a threshold comparator 50. An optional filter (not shown) may be coupled across the switch 51, which when open circuit couples the filter into the circuit for filtering the PGA output. Alternatively, when closed, control switch 51 shorts the filter and takes it out of the circuit.

Threshold comparator 50 comprises a pair of comparators 52 and 54 which detect positive and negative going noise pulses of the PGA 47 output respectively. Comparator 52 has an input 56 coupled to the PGA 47 and an inverted threshold input 58 coupled to high reference analog voltage $V_{REF\_HI}$. Comparator 54 has an inverted input 60 likewise coupled to the PGA 47, and a non inverted reference input 62 coupled to low reference analog voltage $V_{REF\_LO}$. Respective high and low reference voltages $V_{REF\_HI}$ and $V_{REF\_LO}$ are centered about center voltage $V_{AGND}$ in accordance with the expression: $V_{REF\_HI} = V_{AGND} + \Delta V$ and, $V_{REF\_LO} = V_{AGND} - \Delta V$. These values namely $+\Delta V$ and $-\Delta V$, are each a fixed detection threshold, and which may be set in a known manner by a voltage divider, not shown. Alternately these reference values may be made programmable using a voltage digital to analog converter (VDAC).

The comparators 52 and 54 each have a corresponding output 70, 80 coupled to a corresponding AND gate 74, 76. AND gate 74 has an input 78 for receiving a positive going trigger signal when the received noise passes above the selected threshold ($V_{REF\_HI}$); and AND gate 76 has an input 81 for receiving a negative going trigger signal when the received noise passes below the selected threshold ($V_{REF\_LO}$). When enabled by a comparator enable signal (ris_en) on input 78 corresponding to a positive going pulse of noise from PGA 47, AND gate 74 produces a pulse at output 82. Likewise, when enabled by a comparator enable signal (fal_en) on input 81 corresponding to a negative going pulse of noise from PGA 47, AND gate 76 produces a pulse at output 84.

The pulses at outputs 82 and 84 are logically ORed in OR gate 86, which couples either a logic indication of a positive or negative going noise pulse to a sync source multiplexor (U2) 98 at input 90. Sync source multiplexor (U2) 98 has an external logic synchronization input 92 for receiving a logic synchronization signal from the display controller for the display 12 if it is available from the manufacturer. The comparator output signals (high-going or low-going noise pulse as appropriate) may be coupled to synchronization source input 90 of sync source multiplexor 98. The arrangement allows the sync source multiplexor (U2) 98 to select between synchronization source input 90 provided by the noise detector 50 and logic synchronization input 92.

A programmable delay line 100 includes a plurality of flip flops 102a-n. Each flip-flop 102a-n has a C input, a D input, and a Q output. The C input of the flip flops 102a-n are commonly coupled to a $F_{CLK\_DEL}$ clock signal which defines the interval period. The Q output of each flip-flop 102a-n may be coupled to mux 106 and to the D input of each successive down stream flip-flop as shown. Flip-flop 102a may have its D input coupled to the output 104 of the sync source multiplexor U2 98. The sync pulse $V_{SYNC}$ from U2 starts or resets the flip-flop 102a and the $F_{CLK\_DEL}$ clocks the programmable delay line 100 such that each flip-flop delivers a delayed output to mux 106 until the programmable delay line 100 may be reset by the next sync signal. In this way, the programmable delay line 100 may be used to phase match the synchronization signals with noise edges or the start of capacitance sensing. This may be required when used with certain display controllers having internal buffers or internal synchronization circuits, which may cause a delay between an external synchronization signal and display noise edges. This may also be required with noise detection circuits 40 when necessary to delay the start of scanning to avoid additional noise pulses following the initial pulse.

The programmable delay line 100 may be coupled with a programmable look up table 110, sometimes hereinafter referred to as a LUT which has alternate A and B inputs for alternating between the logic sync source feeding sync source multiplexor U2 98 or the noise synchronization signal. For example, synchronization may be provided by the display controller for display 12 supplied by the manufacturer or the synchronization may be provided by the noise detection circuit 40. If the sync signal is properly timed by the $V_{SYNC}$ signal, the A input from sync source multiplexor U2 98 on output 104 may be enabled by the state machine. If the sync signal is provided by the programmable delay line 100, the B input of LUT 110 may be enabled over mux output line 108 of mux 106 by state machine 46. Mux output line 108 of mux 106 may be a bus containing the state of multiple flip-flops in the programmable delay line 100. The input B to LUT 110 may be a bus accepting the state of multiple flip-flops in delay line 100. Additional synchronization events may be formed as desired in a particular application.

LUT 110 has a number of possible state configurations, but in accordance with the exemplary embodiment, only two states namely, A and B or states A (inverted) B (inverted) are employed. In an alternate embodiment, both the A and B inputs may be used at the same time by the LUT to provide synchronization events to the state machine 46 and other circuits.

A time measurement circuit 114 may be provided, including an interval counter 116 which drives an interval discriminator 118 and an intervals FIFO buffer 120 or FIFO 120. Noise pulses received from the display 12 are typically separated by short 2-3 μs intervals. The noise signals are synchronized with positive edges of a synchronization signal $F_{CLK\_INT}$. Interval counter 116 measures the intervals between the noise pulses synchronized with adjacent positive edges of the synchronization signal $F_{CLK\_INT}$ and passes the measured interval via output 117 to interval discriminator 118. The interval discriminator 118 filters unwanted noise events and may be used to measure noise parameters. The interval discriminator 118 may be programmed or controlled by the CPU 16 to compare counts produced by the interval counter 116 with a preset or defined number of interval counts set or defined by CPU 16 for the following conditions:

Interval larger than predefined value
Interval smaller than predefined value
Interval within predefined value range Once a valid synchronization interval is detected, one or more subconversions may be initiated. The intervals FIFO buffer 120 may be employed to count the time between noise events. If, for example, an interval is defined as having a given number of counts, e.g., C counts, then C noise pulses which can initiate synchronization may be ignored until the FIFO 120 becomes reset by the CPU or by register firmware.

Figure 3:
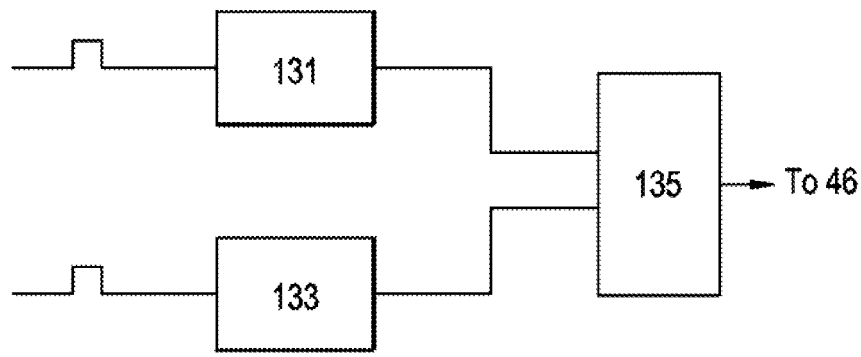
FIG. 3 is a schematic illustration of an interval discriminator employed in an exemplary embodiment.

There are a number of possible implementations of the interval counter 116 and interval discriminator 118. For example, as shown in FIG. 3, interval counter 116 may employ a first counter 131 and a second counter 133 operating in an interleaf configuration, wherein first counter 131 may be responsive to odd edges and counts between the odd and even edges of the sync signal. The second counter 133 may operate when the first counter is disabled. The count values may be passed to a digital comparator 135 which may pass the synchronization event to a state machine 46 if the desired interval condition is met. Alternatively, the interval circuit described herein may be bypassed by means of mux U1, 138 which receives the synchronization signal on output line 140 of LUT 110 and the interval discriminator output 142 as shown. When bypassed by mux U1, the state machine receives a synchronization signal for every noise or synchronization event.

The FIFO 120, responsively coupled to the interval counter 116, stores intervals between adjacent synchronization edges or pulses. When full, the FIFO 120 produces an interrupt IRQ on output 146 for CPU 16. The CPU analyzes the noise intervals and determines the noise repeating period in order to select an appropriate sample subconversion time. In the exemplary embodiment, the sample subconversion time may be equal to either the display noise repeating pattern, or an integer multiple of the same. Such an arrangement may be an expedient which avoids the necessity for a bulky phase locked loop PLL circuit which may be used.

The state machine 46 controls the synchronization of the noise events with the scanning sequence of the touch screen. In the arrangement illustrated, the state machine supports two preprogrammed synchronization modes as follows:

Individual subconversion synchronization. (FIG. 4A)
Whole sample conversion synchronization. (FIG. 4B)

In FIG. 4A, individual subconversions may be tracked. periodic noise spikes $V_{DISP}$ may appear at the output 49 of programmable gain amplifier or PGA 47. The logic output 90 of OR gate 86 comprises the $V_{SYNC}$ pulses as detected by noise detection circuit 40. The interval counter 116 counts a selected number of $V_{SYNC}$ pulses and produces a count state as an input to interval discriminator 118. At selected count states, interval discriminator 118 produces an output $V_{TRIG}$ on output 142. Each $V_{TRIG}$ output of interval discriminator enables a subconversion 150 comprised of n $V_{TX}$ pulses for each subconversion 0, 1, 2 . . . N. A pause 152 may be introduced between subconversions 0, 1, 2 . . . N as shown, which depicts the delay waiting for the next $V_{TRIG}$ to start each following subconversion.

In an exemplary whole sample mode arrangement shown in FIG. 4B, which is otherwise the same as FIG. 4A, the state machine 46 may be programmed to ignore the intervals between subconversions so that there are no pauses. In the whole sample mode, the state machine waits for the synchronization event for the first subconversion only, and following subconversions are executed automatically in series 153 as shown in FIG. 4B. Once conversion is complete, the synchronization event may be used for the next conversion synchronization in the whole sample mode.

State machine 46 may be employed to implement timeout protection by means of timeout counter 160. The timeout counter 160 tracks the time between noise sync pulses. If no sync pulse appears in a given number of clock cycles, determined by the CPU 16, the timeout counter 160 initiates a sync pulse to start the next subconversion. This may thus allow scanning to continue during those periods, e.g., the vertical blanking interval, when the display 12 may not be generating noise events.

Tx clock 162 produces an AC signal $V_{Tx}$ on the Tx electrodes (FIG. 1). The Tx clock 162 may be reset by a state machine Reset output 53 in response to a cycles counter 164 which tracks the conversion cycle time and automatically resets the Tx clock 162 after a selected interval comprising a predetermined number of cycles. In one embodiment the $V_{Tx}$ signal may approximate a square wave. In an alternate embodiment the $V_{Tx}$ signal may approximate a sine wave. In a further embodiment the $V_{Tx}$ signal may be a complex waveform.

Subconversion counter 166 tracks the number of subconversions in a conversion. The counter signals the state machine 46 after a programmed number of conversions have completed. The various counters and clocks are governed by programmable registers as required.

The Tx clock 162, coupled to the state machine reset through cycles counter 164, may be employed to start a synchronization event waiting state. As a result, phase jitter, equal to up to one Tx period may be eliminated, because Tx clock 162 starts operation from the same internal state before each subconversion. Jitter may degrade the benefits of the synchronization circuit resulting from the phase difference between noise and the $V_T$, signal from the Tx clock 162, whereby a different noise amount may be captured at different subconversions.

In the second synchronization mode, when the subconversions are executed serially without pauses 152, the Rx channel's immunity to external noise may be improved. When subconversions are continuous; i.e., with no gaps between them, the Rx channel becomes much more narrow-band in operation. Note that this improvement occurs in the frequency domain response of the Rx channel. As a result, the option of individual subconversions and whole or contiguous conversion may be employed as required.

Non-synchronized noise pulses typically affect different subconversions non-uniformly. If a noise pulse falls during a subconversion interval, the subconversion may be adversely affected. According to an exemplary embodiment, one or more subconversions may be deleted from the conversion data to smooth out or average the noise. This may be accomplished by digital filters as illustrated in FIGS. 5 and 6.

Figure 5:
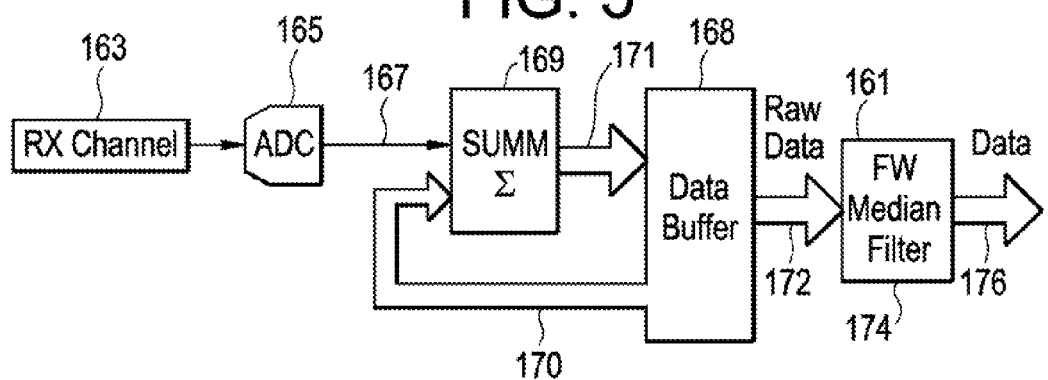
FIG. 5 is a schematic block diagram of a display noise suppression system employing a digital filter.
Figure 6:
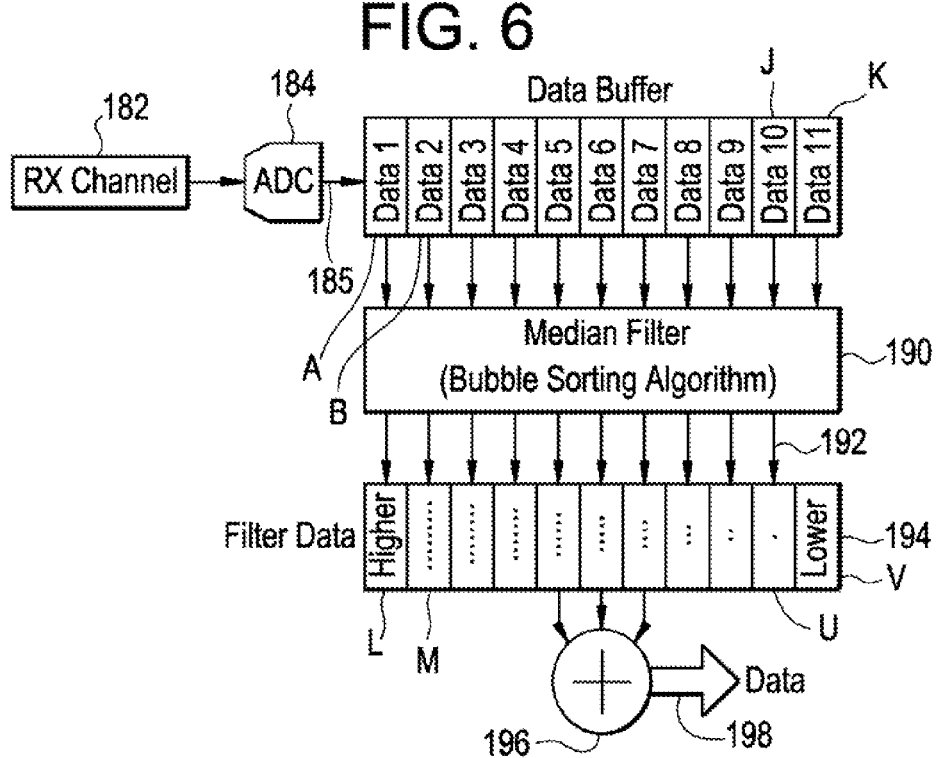
FIG. 6 is a block diagram illustrating a display noise suppression system where the digital filter may be a median filter.

In FIG. 5, a digital noise filter circuit 161 may be disposed at the output of the Rx channels in touch screen controller 10. The noise filter circuit 161 may be employed with the synchronization circuit shown in FIG. 2 to further improve noise reduction. The noise filter circuit 161 may be coupled to Rx channel 163 of the touch screen controller 10. The output of Rx channel 163 may be coupled to analog to digital converter (ADC) 165. The output 167 of ADC 165 (a digital value) may be coupled to a summing circuit (simple adder ALU) 169. The output 171 of summing circuit 169, coupled to a data storage buffer 168, may be configurable for two modes of operation.

When the firmware filter block is not enabled, the data storage buffer 168 sums the current subconversion ADC result 167 with the previously stored subconversion result data received from data storage buffer output 170 which extends to summing circuit 169 as shown. The resulting sum 171 from this operation may be then stored into the same storage location in data storage buffer 168, thus forming a digital integrator.

When the firmware filter block 174 is enabled, data storage buffer output 170 may be forced to all zeros (0), such that the summing circuit 169 adds zeros to the subconversion ADC result 167, and each sequential subconversion result may be stored in a different location in the data storage buffer 168. In an alternate embodiment the summing circuit 169 may be bypassed to perform this same zero-add function. The output 172 of the data storage buffer 168 may be coupled to a firmware filter block 174 which may produce a data signal 176 having reduced noise. Firmware filter block 174 may be a median filter. Other filters are also useful as required. Firmware filter block 174 may be realized as a fixed or programmable state machine, or may exist as instructions running on a processor. When the configured for operation as a digital integrator, firmware filter block 174 may be bypassed. Such a configuration may be referred to herein as a window filter which may perform a simple averaging of the data.

FIG. 6 illustrates an exemplary firmware filter circuit, 180 having an operation that generally follows the arrangement of FIG. 5 when firmware filter block 174 may be configured for operation as a median filter. The firmware filter circuit 180 operates as a noise filter and has an Rx channel 182 coupled to an ADC 184. The output 185 of ADC 184 does not pass through a summing circuit, but may be instead coupled to a data storage buffer 186 having a selected number of storage locations designated A-K. In the exemplary embodiment there are 11 cells which store respective samples of the subconversion results. The outputs 188 of data storage buffer 186 are coupled to a median filter 190. The median filter 190 has its outputs 192 coupled to data storage buffer 194 having a corresponding number of cells designated L-V. The Median filter 190 may be programmed with an algorithm (known as a bubble sorting algorithm) which selects the A-K outputs of the data storage buffer 186 and populates the L-V cells of the data storage buffer 194 in descending order (highest to lowest) as shown. In the arrangement, the highest value in cell L and the lowest value in cell V are discarded, and the remaining cells M-U are summed and averaged at adder node 196, The resulting data 198 thus transmitted has an improved signal to noise SNR characteristic. firmware filter circuit 180 may be implemented all in hardware using memory locations and one or more state machines. In an alternate embodiment firmware filter circuit 180 may be implemented by instructions executing on a processor, or some combination of hardware and firmware.

In yet another exemplary embodiment noise may be suppressed by means of a delay technique which follows the average value of the input signal and uses a delay line for cycle-by-cycle change variation tracking and discard. A switching capacitor delay line may be used to delay the signal and noise. The noise may be detected by listening for the charge variation in the receiver channel Rx. An analog delay may be introduced into the captured signal to allow real-time processing of individual charge packets.

Figure 7:
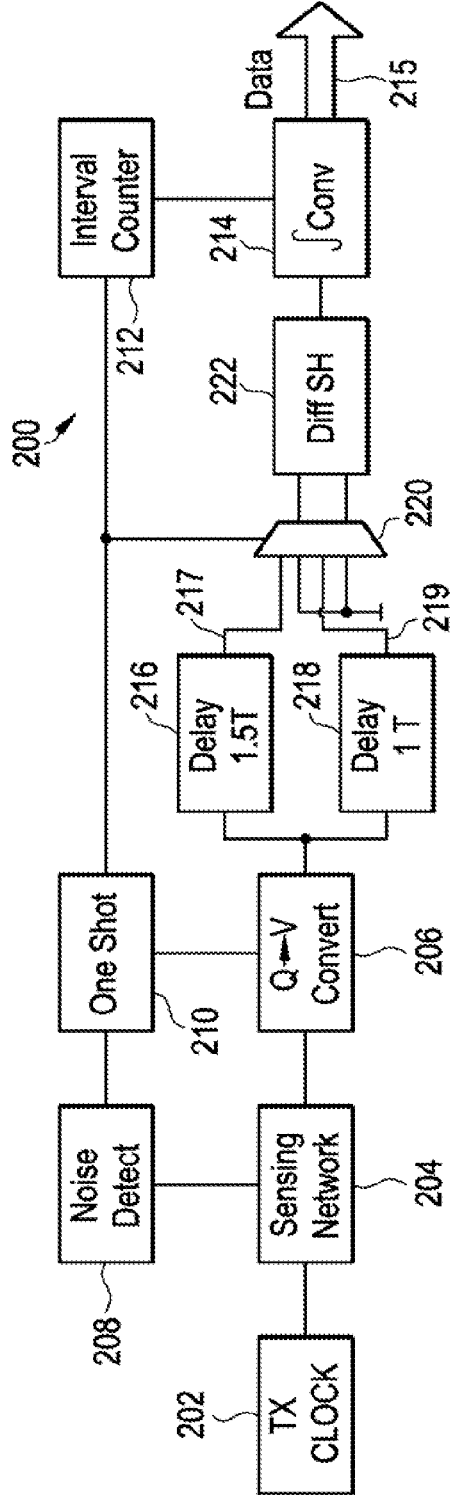
FIG. 7 is a schematic block diagram of a variable measurement time technique for restoring a noise damaged or missing signal.
Figure 8:
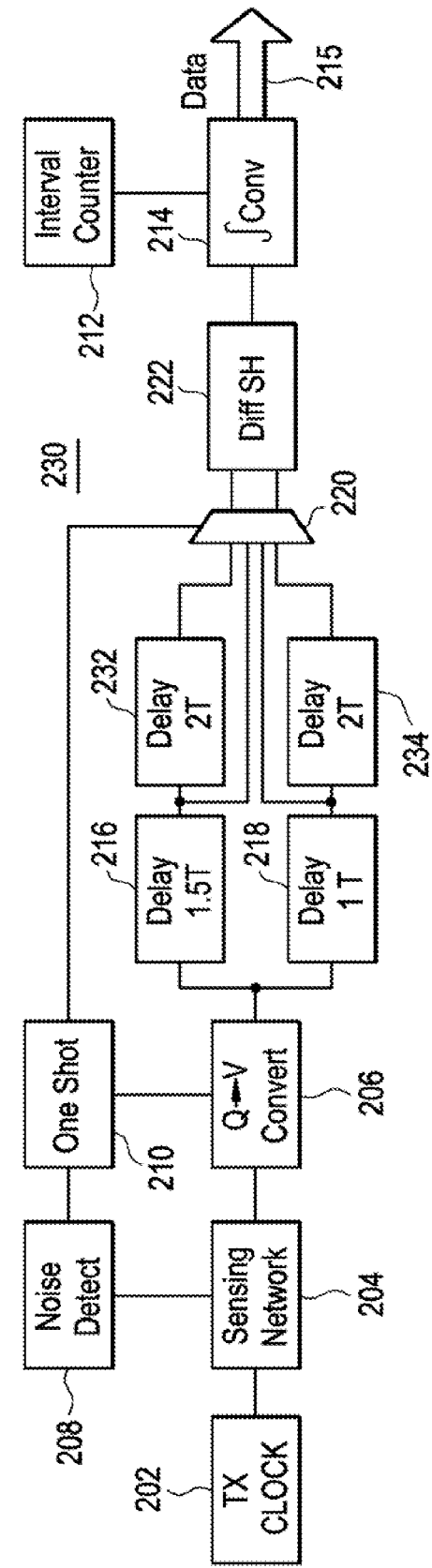
FIG. 8 is a schematic block diagram of a fixed measurement time technique for restoring a noise damaged or missing signal.

FIG. 7 illustrates an exemplary embodiment of a switching capacitor delay line circuit 200 for removing noise events from the measured signal. FIG. 8 may be a circuit similar to the arrangement of FIG. 7, but having an additional delayed signal, and the ability to introduce a corrective or restorative signal into the measured signal when noise events occur.

Figure 9:
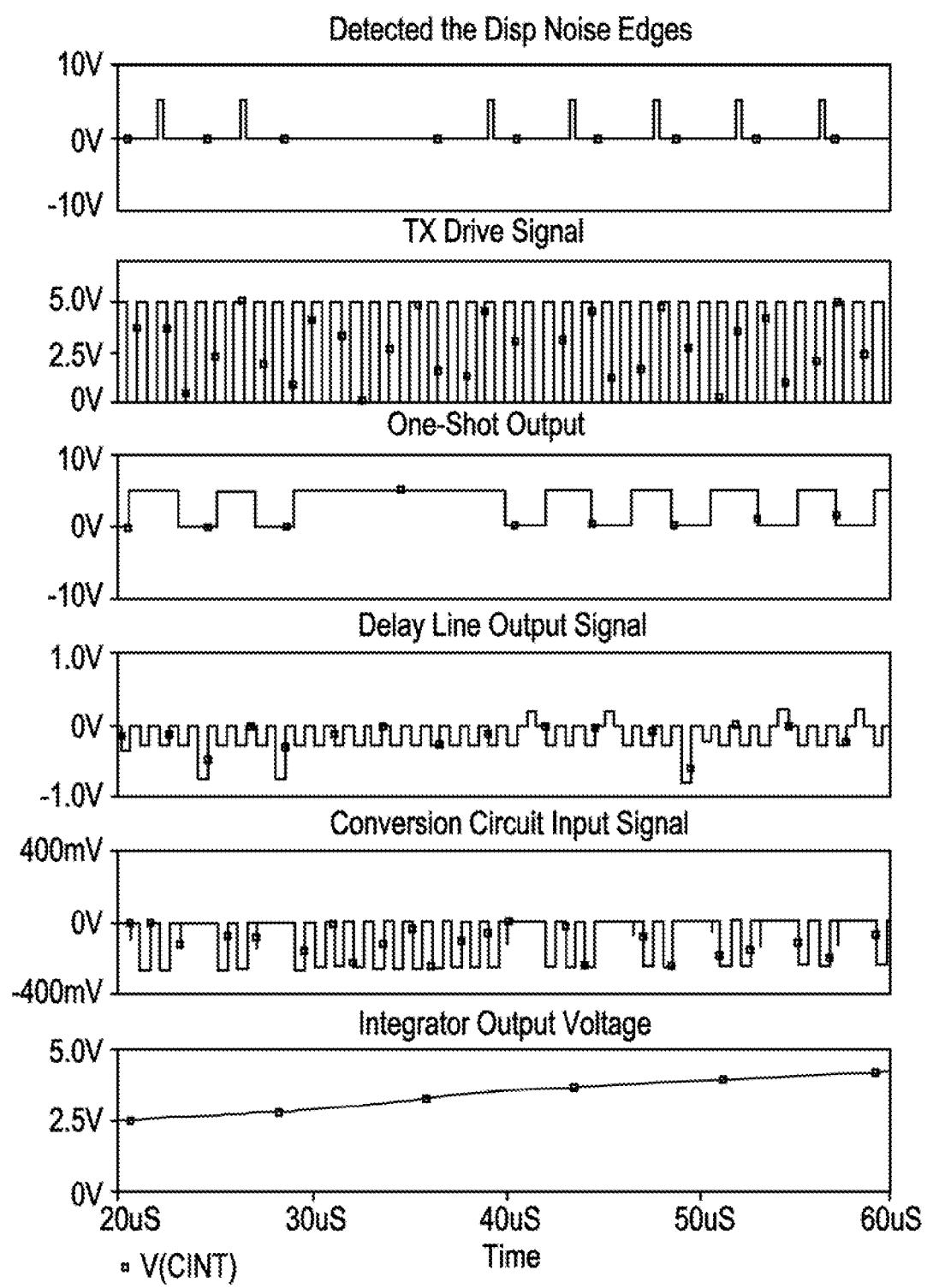
FIG. 9 is a timing chart for the arrangement of FIG. 7.
Figure 10:
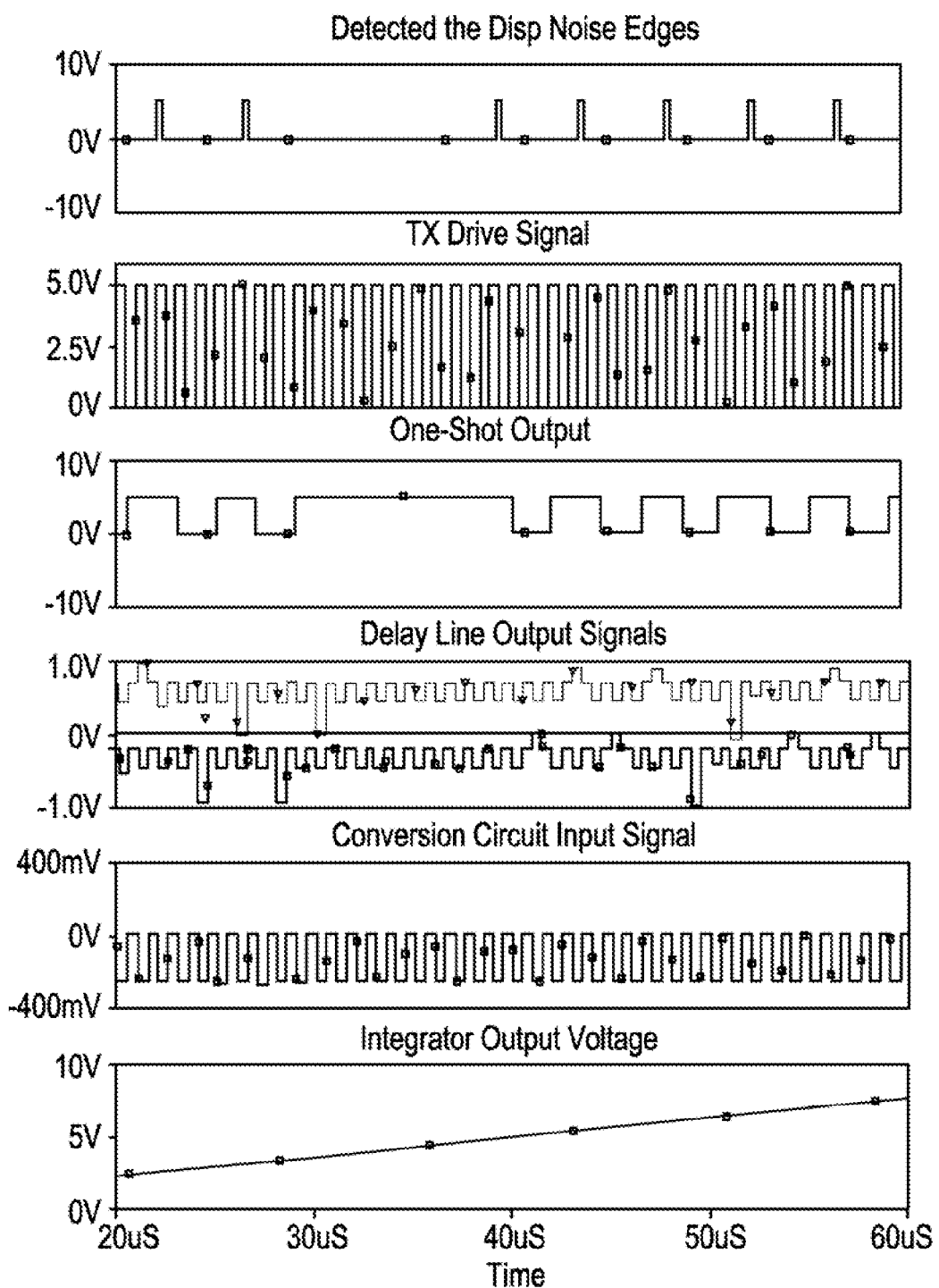
FIG. 10 is a timing chart for the arrangement of FIG. 8.

FIGS. 9 and 10 are timing charts showing the correction introduced by the arrangement of FIGS. 7 and 8 respectively.

The switching capacitor delay line circuit 200 has a Tx clock 202, which may be coupled through a Tx driver to a Tx electrode of the touch screen panel 14 (FIG. 1). Sensing network 204 of the touch screen controller 10 provides an output to charge-to-voltage or QV converter 206. The sensing network also provides a signal to noise sensor or noise detector 208 which may trigger a one shot 210 when noise events are detected. One shot 210 is coupled to an interval counter 212 and a signal source selector mux 220. Noise detect 208 may be similar to the noise detection circuit 40 in FIG. 2. The interval counter controls an integrator 214 which provides an output 215. A first charge pulse from QV converter 206 may be coupled a 1.5 T analog delay 216 having a delay corresponding to 1.5 Tx clock periods; and a second charge pulse from QV converter 206 may be coupled to a 1.0 T analog delay 218 having a second delay corresponding to 1 Tx clock period, wherein the first and second charge pulses are generated by the first and second half-cycles of each AC Tx excitation cycle. The selector mux 220 may be responsive to the one shot 210 so as to select outputs 217 and 219 of the referenced analog delay elements when a noise event has not been detected, and to select a reference (e.g., ground) level when a noise event is detected. The output of the selector mux 220 may be coupled to differential sample and hold (DSH) 222, the output of which may be coupled to integrator 214.

The signal from the Tx clock 202 may be coupled internally into sensing network 204, the QV converter 206, and noise detector 208. The delay line operates selectively to transfer each half cycle of charge coupled from the selected Rx electrode. The accumulated signal for half of the Tx signal may be delayed in either the 1.5 T analog delay 216 or the 1 T analog delay 218. When no noise event has been detected, the 1.5 T delay 216 and the 1 T delay 218 present the two halves of the received signal to the differential sample and hold (DSH) 222 as selected by the differential multiplexor 220. The output of the 1.5 T delay 216 and 1 T delay 218 are captured by DSH 222 which feeds integrator 214.

The detected noise supplied to one shot 210 forms variable conversion time gating pulses, synchronized with the analog delay line clock signals. The one shot 210 controls the selector mux 220 which supplies the DSH from the analog delay line when no noise is detected or it grounds the inputs when the input signal has been corrupted by a noise event. The one shot 210 gates the conversion interval counter 212 such that it does not count during these noise events, thereby increasing the conversion or sampling time for discarded pulses, thereby compensating for the same.

Alternatively, a fixed sampling or conversion time interval for the arrangement of FIG. 7 could be employed at the cost of less effective utilization of the conversion interval. The selector mux 220 blocks the propagation of noisy signals to the conversion circuit at the cost of a variable conversion time by increasing the conversion time interval for the duration of noise events.

An alternative circuit is illustrated in FIG. 8 which employs a constant or fixed sampling time or constant conversion time circuit 230. The arrangement is similar to FIG. 7 where the same components are labeled with the same reference numbers, with the following differences. Instead of grounding the input to selector mux 220 for constant conversion time circuit 230 when noise is detected, another delayed copy of a non-corrupted signal may be selected which may be a substitute for the noise compromised signal. The conversion circuit operates continuously and independently of noise present. The conversion interval counter 212 may not be gated. Note that this operation effectively replicates a received signal identified as not corrupted by noise, by passing it to the DSH 222 on two consecutive Tx periods. To limit propagation of noise events into the integrator 213, such operation may normally be used when the noise events do not occur on consecutive Tx periods.

The constant conversion time circuit 230 employs first 2 T analog delay 232 and second 2 T analog delay 234 coupled to the respective outputs of 1.5 T analog delay 216 and 1 T analog delay 218. When no noise event has been detected, 1.5 T delay 216 and 1 T delay 218 are selected by the selector mux 220 to provide the measured signal to differential sample and hold 222. When a noise event is detected by noise detect block 208, it signals one shot block 210 to generate a pulse to change the selector input to selector mux 220 such that the output of 2 T analog delay 232 and 2 T analog delay 234 are selected instead of 1.5 T analog delay block 216 and IT analog delay 218 respectively. Since the signals present in these 2 T analog delay blocks contain a sensed signal that was not corrupted by a noise event (effectively 3.5 T and 3 T total delays), this value may be safely passed to DSH 222 for integration in integrator 214 without significant negative impact on the total measured value. Thus regardless of if the selector mux 220 is configured to select the short delay path for non noise samples, or the long delay path when noise events are detected, conversion circuit 230 (FIG. 8) operates over a fixed number of intervals and may be operative to provide a fixed conversion time as determined by interval counter 212, while also integrating a fixed number of samples. In the arrangement shown, the one shot 210 does not gate the interval counter 212 because the fixed conversion time has been established.

The operation waveforms for the arrangement of FIG. 7 are illustrated in FIG. 9. The operation wave forms for the arrangement of FIG. 8 are illustrated in FIG. 10. These waveforms illustrate how the delay line output signals result in a uniform conversion signal input and a corresponding uniform integrator output.

Figure 11:
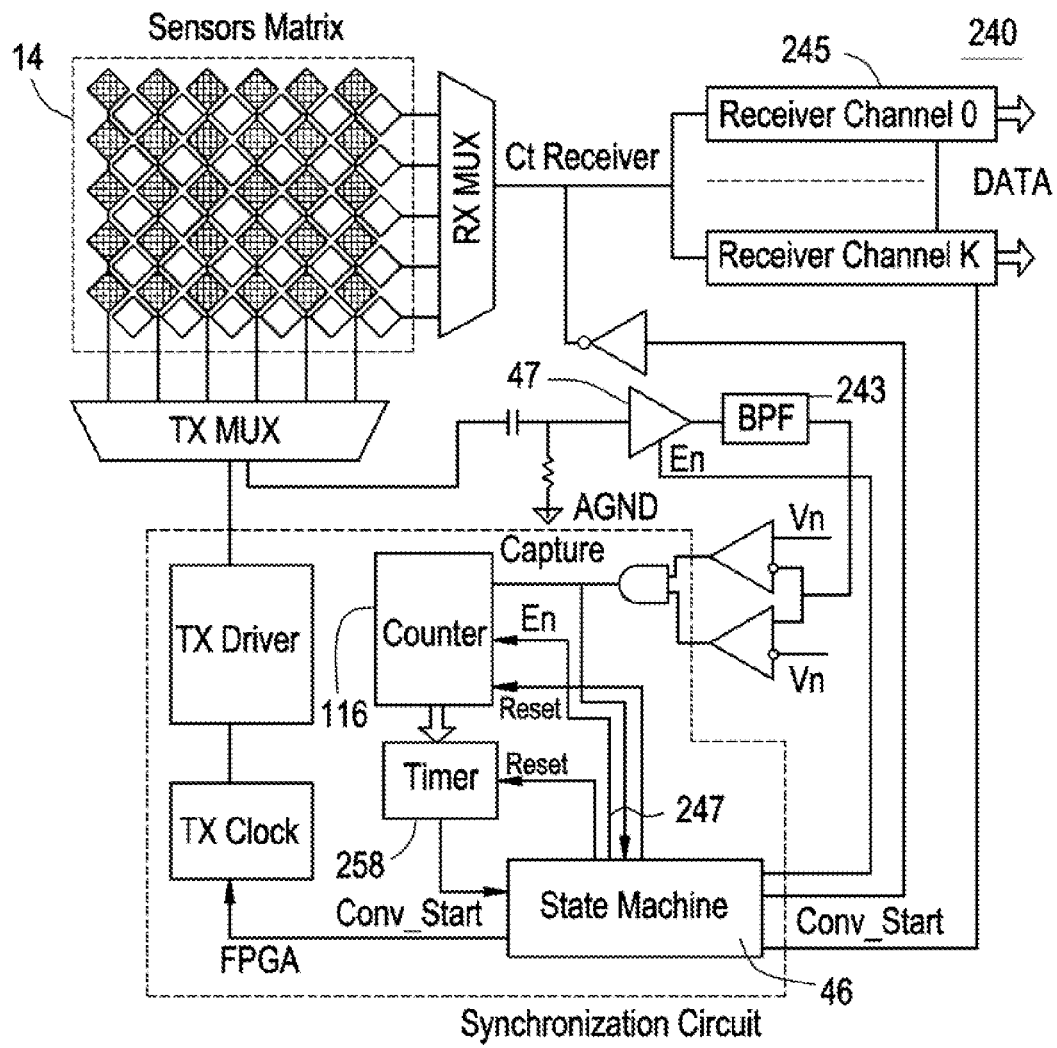
FIG. 11 is a schematic block diagram of a display noise suppression system employing a noise blanking feature.
Figure 12:
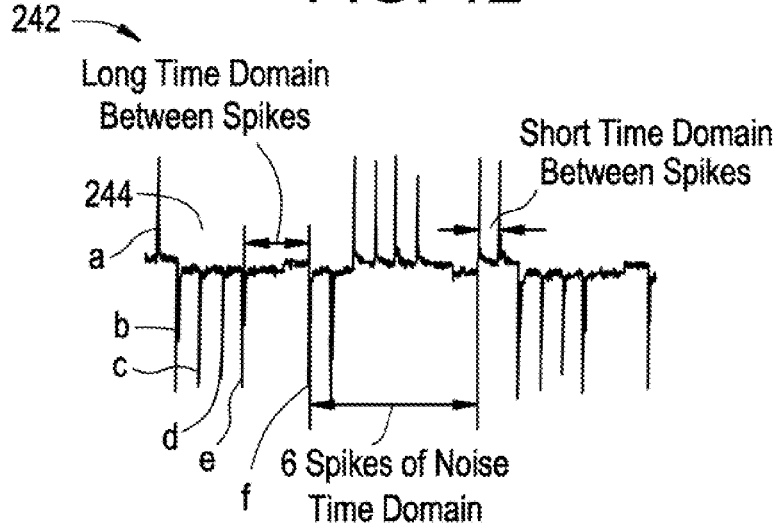
FIG. 12 is an illustration of a typical periodic noise signal having long and short durations between noise events.

FIG. 11 is an illustration of a noise detection circuit 240 wherein the touch screen may be measured only during certain time intervals. A typical noise waveform is illustrated in FIG. 12. As can be readily appreciated, noise 242 is represented by the spikes 244 which may be periodic. In the illustration, the noise has 6 spikes a-f. Spikes a-e occur in five short time domains of around 4.27 µs; and spike f occurs in a relatively long time domain of about 12.8 µs. The six spikes a-f occur over a 34.15 µs interval.

The presence of a relatively long time period makes it possible to synchronize to the noise periods as previously described. Synchronization may be performed at the end of the long time interval. Alternately synchronization may be performed to the start of the long time interval. According to the arrangement described herein, this mechanism for synchronization resynchronizes itself over each repeating noise cycle or interval, and may be insensitive to noise period measurement errors.

Figure 13:
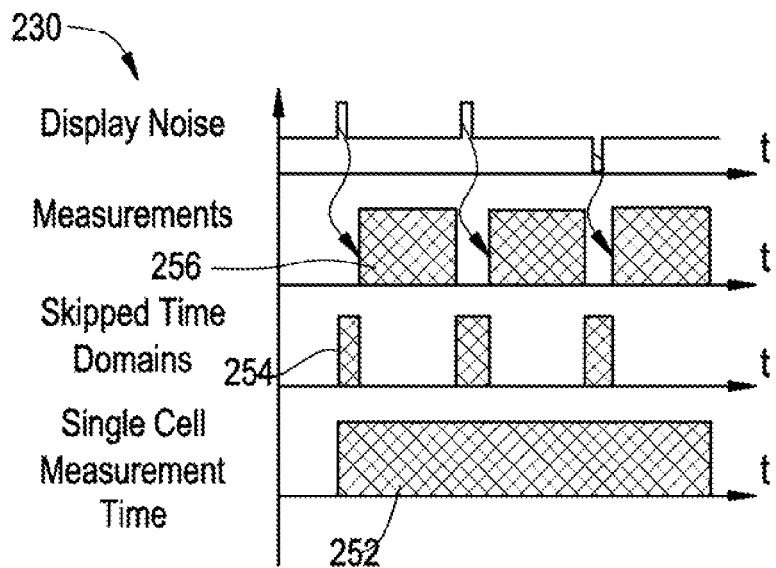
FIG. 13 is a timing chart for the arrangement of FIG. 11 illustrating noise blanking.

FIG. 13 shows the timing chart for the arrangement of the circuit shown in FIG. 11 which employs synchronization as described above with respect to FIG. 2, and wherein similar components have the same reference numbers. According to the illustrative embodiment, image dependent noise 250 may be gated or synchronized with the measurement time 252. However, the signal measurement may be gated, blanked or skipped during skipped time intervals 254 when noise is present. The skipped time interval 254 occurs for a selected period or duration following noise synchronization. At the end of the skipped time interval 254, a subconversion measurement 256 may be made. This subconversion measurement may be initiated in state machine 46 by output pulses produced by interval counter 116 in response to an interval counter enable 247 produced by the state machine 46 in response noise pulse 250. Subconversion measurement does not occur during the interval when the interval counter is stopped as illustrated. The timer 258 in FIG. 11 is typically reset by the state machine and may be clocked similar to the Tx clock 162 and cycles counter 164 (FIG. 2). The timer 258 reconstructs the noise and measurement intervals for providing gating information to the state machine 46 which controls the measurement cycle.

Figure 14:
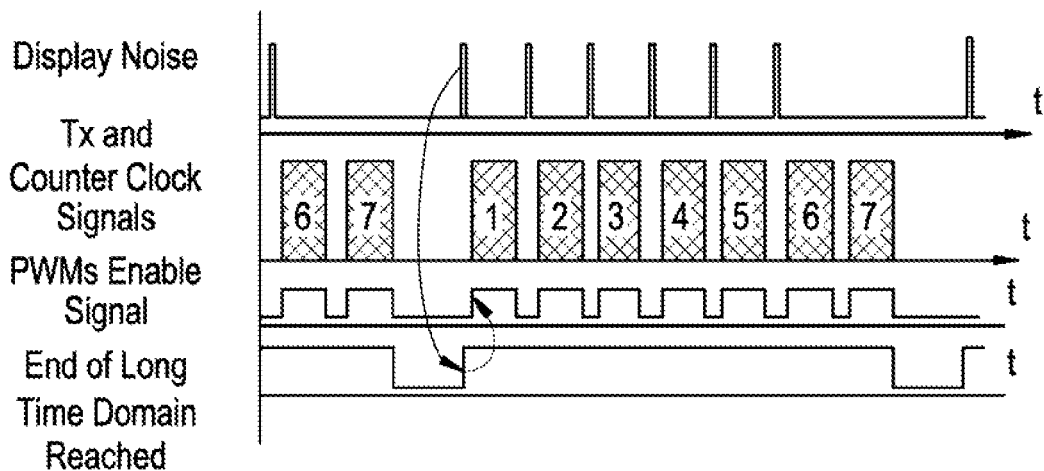
FIG. 14 depicts the timing chart for generation of Tx and clock signals for the arrangement of FIG. 11.

Display (e.g. display 12) noise may be captured and amplified by programmable gain amplifier 47 and high pass filter 243. Synchronization may be provided by the state machine 46 as previously described. The intervals when generation of Tx and counter clock signals are typically enabled are shown in FIG. 14.

Figure 15A:
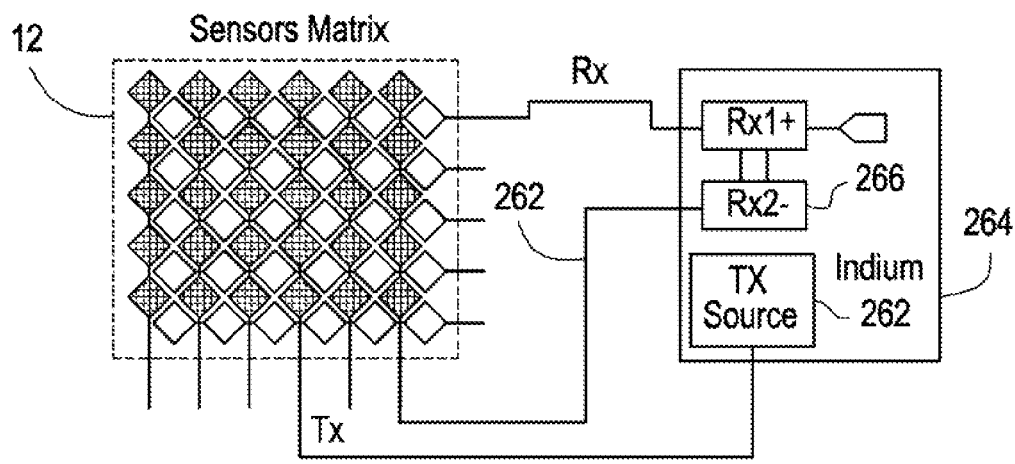
FIGS. 15A-15C illustrate a variety of sensing approaches for removing noise in the receiver channel of a touch screen controller through subtraction.
Figure 15B:
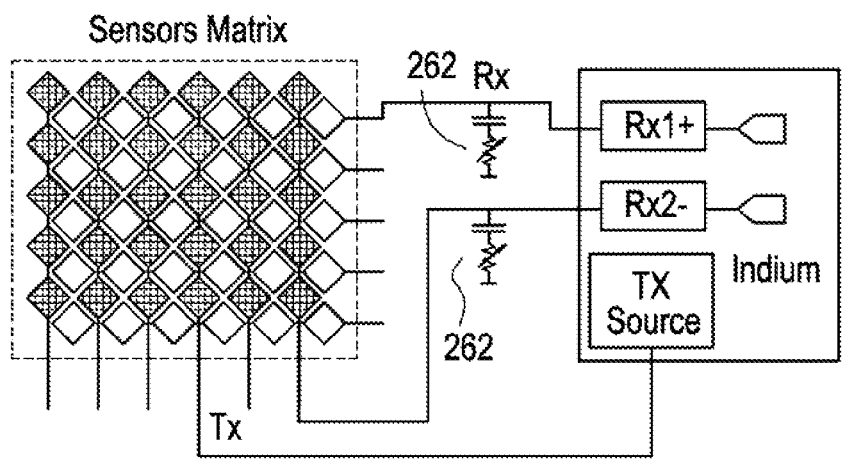
Figure 15C:
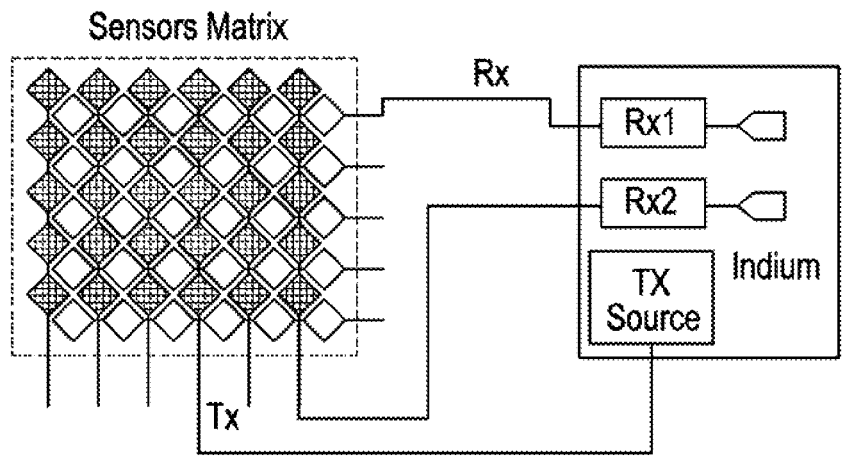

In accordance with another exemplary embodiment, it may be also possible to subtract the display noise in the analog domain as a common mode signal. FIGS. 15A-15C. illustrate various embodiments of a differential detector.

FIG. 15A illustrates an embodiment employing an analog circuit and a Tx source 260. An Rx electrode and an unused Tx electrode for one side of the noise signal may be coupled to the detector as shown. The Rx electrode is coupled into a positive input of a differential receiver indicated as Rx1+. A non-driven Tx line is coupled to the negative input of the same differential receiver indicated as Rx2−. Since the display couples noise across its entire surface, both the selected Rx electrode and the non-driven Tx electrode see a near equal amount of noise. When this near equal signal is presented as input to a differential receiver, it appears as common mode, which is rejected by the receiver. Thus the common mode noise portion is removed from the Rx signal and only the remaining portion is passed to the Rx channel for integration and conversion.

FIG. 15B illustrates an analog circuit similar to FIG. 15A with gain balancing. Because most touch screens have asymmetrical aspect ratios, it is highly probable that surface area of the Rx and Tx electrodes will not be identical, such that each will receive different amounts of noise charge. Accordingly it is necessary to adjust the gain of either the Rx or Tx electrode signal to match that of the other. FIG. 15B is an Rx-Rx analog circuit similar to FIG. 15A, but may employ gain control or gain balancing using a variable RC network 262 for each input to the differential receiver.

FIG. 15C illustrates a digital embodiment of noise subtraction having a similar electrode arrangement as that shown in FIGS. 15A and 15B. Here the Rx electrodes are connected to Rx channels in the touch screen controller 14 which perform conversions to measure the capacitance of the locations 18 of the touch screen 14. A separate Rx channel, Rx2 in FIG. 15C, is also configured to measure capacitance but is connected to a non-driven Tx electrode. Since this Tx electrode is parallel to the active or driven Tx electrode, the active Tx driver does not couple energy to that non-driven electrode, but the display may still couple noise charge to this un-driven Tx electrode. Conversion measurements of the selected Rx electrodes and selected Tx electrode will both contain noise energy coupled from the display. Since the conversions of the Rx and Tx electrodes were done in parallel, they may both contain approximately the same noise charge. Following conversion the CPU (FIG. 1) may then subtract the measured noise value captured from the non-driven Tx electrode, from the values measured on the Rx electrodes. Such digital subtraction of coupled noise removes the need for a differential receiver at the input to each Rx channel, as well as the need for any analog gain adjustment capability. While such gain correction may still be needed, this can be done as either an offset of scaling factor of the captured Tx electrode noise as performed using the CPU 16.

While the illustrated exemplary embodiments of FIGS. 15A-15C described above employ one each of an Rx and unused Tx electrode, it should be understood that other arrangements using one or more Rx and Tx electrodes, alone or combination, may be employed to couple noise to the detector as desired in a particular application.

The various circuits described above perform as intended in analog and digital environments. When combined with synchronization, noise blanking, delay lines and filters each are effective to improve performance and reduce the impact of coupled noise.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in a simple block diagram format in order to avoid unnecessarily obscuring the present invention. Thus, the specific details set forth are merely exemplary. Particular implementations may vary from these exemplary details and still be contemplated to be within the spirit and scope of the present invention.

References in the description to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions. The computer-readable transmission medium includes, but is not limited to, electrical, optical, acoustical, or other form of propagated signal (e.g., carrier waves, infrared signals, digital signals, or the like), or another type of medium suitable for transmitting electronic instructions.

Additionally, some embodiments may be practiced in distributed computing environments where the computer-readable medium may be stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. An apparatus comprising:
   a detector to determine a presence of a noise signal from a display coupled to a capacitive touch screen; and
   a synchronization circuit to synchronize signals produced by a touch screen controller with the noise signal to reduce an influence of the noise signal on capacitance measurements by the touch screen controller.

2. The apparatus of claim 1, wherein the synchronization circuit is a state machine.

3. The apparatus of claim 1, wherein the detector to determine the presence of the noise signal is to sense the noise signal on one or more electrodes of the capacitive touch screen that are not being scanned to detect a touch proximate the capacitive touch screen.

4. The apparatus of claim 3, wherein the one or more electrodes of the capacitive touch screen are scanned to detect the touch proximate the capacitive touch screen while the one or more electrodes are not being used by the detector to determine the presence of the noise signal.

5. The apparatus of claim 3, wherein the one or more electrodes of the capacitive touch screen are solely used by the detector to determine the presence of the noise signal.

6. The apparatus of claim 1, wherein the synchronization circuit to synchronize the signals produced by the touch screen controller with the noise signal is to
   synchronize transmission (Tx) signals with the noise signal.

7. The apparatus of claim 1, further comprising
   a counter to produce output pulses coupled to the synchronization circuit to produce a measurement in response to the output pulses, the counter to stop responsive to an output indicative of the presence of the noise signal, the synchronization circuit configured to be disabled when the counter is stopped.

8. The apparatus of claim 1, further comprising
   a multiplexor to selectively connect one or more electrodes of the capacitive touch screen to the detector.

9. The apparatus of claim 1, further comprising
   a noise filter to average the noise signal over a measurement interval.

10. The apparatus of claim 1, wherein the detector comprises a threshold comparator coupled to selected outputs of the display to produce an output indicative of the presence of the noise signal.

11. The apparatus of claim 10, wherein the detector is a digital circuit.

12. The apparatus of claim 10, wherein the selected outputs of the display comprise at least one transmission (Tx) electrode and at least one receiving (Rx) electrode.

13. The apparatus of claim 1, further comprising
a timer responsive to the detector to measure a duration between a selected number of noise pulses in at least one of a first mode and a second mode when the noise signal is pulsed noise.

14. The apparatus of claim 1, further comprising
a timeout counter to produce output pulses if the presence of the noise signal is not detected, the timeout counter coupled to the synchronization circuit to produce a measurement in response to the output pulses.

15. A method comprising:
performing a listening scan to determine a presence of a noise signal from a display coupled to a capacitive touch screen;
generating signals to detect a touch proximate the capacitive touch screen; and
synchronizing the signals with the noise signal to reduce an influence of the noise signal on capacitance measurements used to detect the touch.

16. The method of claim 15, wherein performing a listening scan to determine the presence of the noise signal further comprises
scanning during a first window of time one or more electrodes of the capacitive touch screen to determine the presence of the noise signal.

17. The method of claim 16, wherein the generating the signals to detect the touch proximate the capacitive touch screen further comprises
scanning during a second window of time the one or more electrodes of the capacitive touch screen to detect the touch, wherein the first window of time is different than the second window of time.

18. The method of claim 15, further comprising
filtering the noise signal by using at least one of a window filter, an averaging filter, or a median filter.

19. A system comprising:
a display to produce images and a noise signal;
a capacitive touch screen overlaying the display;
a touch screen controller, coupled to the capacitive touch screen, comprising a detector and a synchronization circuit,
the detector to determine a presence of the noise signal from the display; and
the synchronization circuit to synchronize signals produced by the touch screen controller with the noise signal to reduce an influence of the noise signal on capacitance measurements by the touch screen controller.

20. The system of claim 19, wherein the detector to determine the presence of the noise signal is to sense the noise signal on one or more electrodes of the capacitive touch screen that are not being scanned to detect a touch proximate the capacitive touch screen.

* * * * *